Dec. 15, 1953    L. H. TAPSCOTT    2,662,405
FLUID LEVEL INDICATOR
Filed Dec. 21, 1950
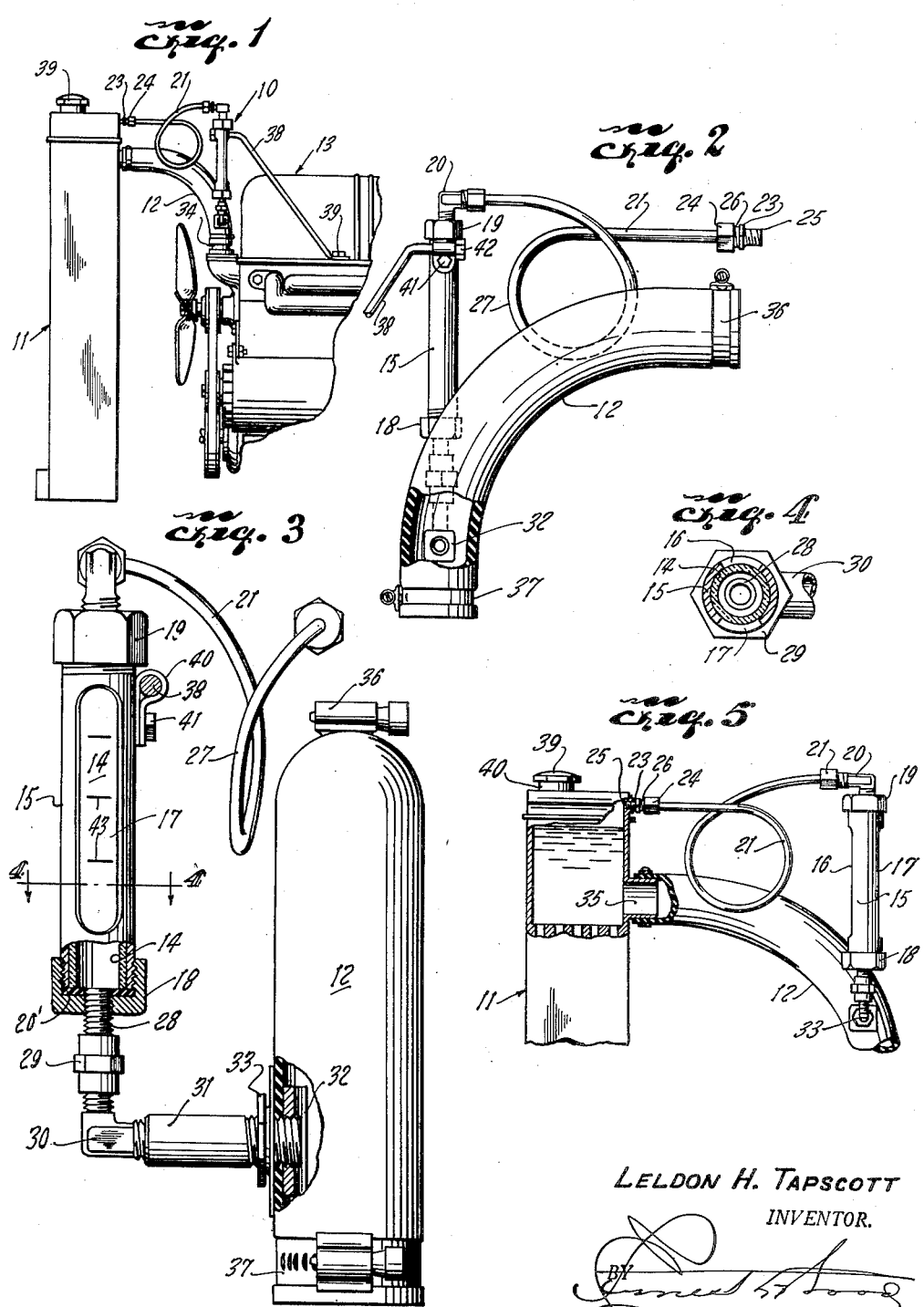
LELDON H. TAPSCOTT
INVENTOR.
BY
ATTORNEY Patented Dec. 15, 1953

2,662,405

UNITED STATES PATENT OFFICE 2,662,405

FLUID LEVEL INDICATOR

Leldon H. Tapscott, Dallas, Tex.

Application December 21, 1950, Serial No. 202,095

1 Claim. (Cl. 73—328)

This invention relates to fluid level indicators and more particularly to a fluid level indicator for attachment to the water cooling systems of internal combustion motors.

The level of water in the water cooling systems of internal combustion motors, such as motor vehicles, must be checked often in order that the supply of water may be replenished before overheating of the motor occurs should the supply of water fall to a dangerously low level. At present, the water level is checked by removing the radiator cap and looking through the filler tube. The removal of the radiator cap in very cold weather or when the motor is hot may cause the hands of the person removing the cap to freeze to the cap or be burned, as the case may be. Moreover, the radiator cap is often greasy and dirty so that removal of the radiator cap results in the soiling of the hands of the person removing the radiator cap. It is desirable, therefore, that a means be provided which can be easily attached to conventional vehicle motors which will enable the level of the water to be checked easily without removing the radiator cap not only to prevent soiling of, and injury to, the hands but also to encourage the frequent checking of the water level which will automatically take place once a checking means is provided which will not cause injury to, or soiling of, the hands of the person checking the water level.

Accordingly, it is an object of the invention to provide a new and improved fluid level indicator.

It is another object of the invention to provide a new and improved fluid level indicator which may be easily attached to the water cooling systems of motor vehicles.

It is still another object of the invention to provide a new and improved fluid level indicator for the water cooling systems of vehicle motors which allows the water level in the radiator to be checked without removing the radiator cap.

For a full understanding of the invention, reference may be had to the following description taken in connection with the accompanying drawing and its scope will be pointed out in the appended claim.

In the drawing,

Figure 1 is a side elevational view of the fluid level indicator of the invention attached to a conventional vehicle motor;

Figure 2 is a side elevational view, with some parts broken away, of the fluid level indicator showing its attachment to the radiator hose of the motor;

Figure 3 is a rear elevational view, with some parts broken away, of the fluid level indicator;

Figure 4 is a sectional view, taken on the line 4—4 of Figure 3; and

Figure 5 is a side elevational view of the fluid level indicator attached to the radiator, some portions of the radiator being broken away.

Referring now to the drawing, the fluid level indicator 10 of the invention is shown connected to the radiator 11 and radiator hose 12 of the motor 13 of a motor vehicle. The fluid level indicator or gage 10 has a transparent tube 14 of glass or other suitable material telescoped in a metal sleeve 15 having elongate windows or slots 16 and 17. The ends of the metal sleeve 15 are exteriorly threaded to engage the interiorly threaded caps 18 and 19 which maintain the tube 14 within the metal sleeve 15. A gasket 20' of rubber or other resilient material is disposed in each cap 18 and 19 and abuts the adjacent ends of the tube 14 and the sleeve 15 to make a fluid tight joint between its associated cap and ends of the tube 14 and the sleeve 15.

Each of the caps has a central threaded aperture. An L-shaped fitting 20 has one threaded end engaged in the central aperture of the upper cap 19 and its other threaded end is engaged by an interiorly threaded connector 25 which connects one end of a metal conduit or pipe 21 to fitting 20. The other end of pipe 21 is connected to the upper portion of radiator 11 by means of a threaded adapter 23 and a connector 24. The smaller or reduced end 25 of adapter 23 is screwed into a suitably threaded aperture in the radiator 11 while the large end 26 is engaged by the connector 24. A loop 27 is provided in the pipe 21 in order that expansion and contraction of the pipe with changes in temperature can take place without subjecting any of the components of the apparatus to undue stress and strain. Also, vibrations and changes in position of the engine with respect to the radiator are compensated for.

The lower cap 18 has a threaded pipe 28 screwed in its central aperture. A coupling 29, an L-shaped fitting 30 and a pipe 31 connects the pipe 28 to the hose 12 of the motor 13. The hose 12 connects the block of the motor 13 to the radiator and serves to conduct the hot water from the motor to the radiator. The end of pipe 31 which extends into the interior of the hose 12 through a suitable aperture in the side thereof is engaged by a flat square plate or nut 32. A lock nut 33 is disposed on pipe 31 exteriorly of hose 12. The hose 12 is connected to an outlet pipe 34 of the motor 13 and to the inlet pipe 35 of the radiator 11 by conventional clamps 36 and 37, respectively.

A bracing rod 38 has one end secured to the motor 13 by means of a bolt 39. Its other end extends through a clamp 40 secured to sleeve 15 by a bolt 41. A nut 42 engages the threaded end of the bracing rod 38 to prevent it from disengaging from clamp 40.

In operation, the level of the water in tube 14 will indicate the level of the water in the upper part of the radiator 11 since the tube 14 is in communication with the interior of the radiator through hose 12 and the various fittings and connectors between the lower cap 18 and the hose. The tube 14 may be provided with indicia or graduations 43 if desired. It will be obvious therefore, that the level of water in radiator 11 can be determined without removing the radiator cap 39 on the filler tube 40 of the radiator by merely observing through one of the windows 16 or 17 in the sleeve 15 the level to which the water rises in the tube 14.

The upper portion of the tube 14 is connected to the upper portion of the radiator 11 through the pipe 21 in order to maintain the equal pressures in the radiator and the tube 14. If the upper end of the tube 14 were closed or open to the atmosphere, an erroneous indication would be given each time the pressure in the radiator exceeds the atmospheric pressure due to heating of the water and the resultant rising of the pressure within the radiator.

It will be apparent that the described fluid level indicator can be quickly attached to a motor vehicle since the radiator need not be removed during the installation of the indicator. Only one hole, for adapter 23, need be drilled and tapped in the upper portion of the radiator which can be done while the radiator remains secured to the vehicle. The rose 12 can, of course, be easily detached for the installation of pipe 23 since it is attached to the radiator and the motor by easily loosened clamps 36 and 37.

Various changes and modifications can be made in the illustrated embodiment of the invention without departing from the invention and it is intended, therefore, to cover all such changes and modifications as fall within the true spirit and scope of the invention.

What is claimed is:

In a liquid level gauge for a motor having a radiator and a hose connection from said motor to the upper portion of said radiator, comprising a sight tube, a bracket secured to said motor for holding said sight tube vertically and on substantially the same level as the top of said radiator at the rear thereof, a flexible tube connecting the upper end of said sight tube to said radiator at a point adjacent the top of said radiator to maintain equal pressures in said radiator and sight tube, and rigid tubular means connecting said lower end of said sight tube to said hose connection at a level below said upper portion of said radiator whereby the fluid in said radiator and said hose connection may flow into said tube.

LELDON H. TAPSCOTT.

References Cited in the file of this patent

UNITED STATES PATENTS

| Number | Name | Date |
| --- | --- | --- |
| 1,110,974 | Van Buskirk et al. | Sept. 15, 1914 |
| 1,316,846 | Marks | Sept. 23, 1919 |
| 1,817,676 | Christie et al. | Aug. 4, 1931 |
| 1,890,900 | Christie et al. | Dec. 13, 1932 |